United States Patent
Downs

(10) Patent No.: US 6,852,171 B2
(45) Date of Patent: Feb. 8, 2005

(54) METHOD AND APPARATUS FOR DEICING MIRRORS OR WINDOWS

(75) Inventor: Stuart G. Downs, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 447 days.

(21) Appl. No.: 10/146,260

(22) Filed: May 15, 2002

(65) Prior Publication Data

US 2003/0213499 A1 Nov. 20, 2003

(51) Int. Cl.$^7$ .............................. B08B 7/02; B08B 7/00
(52) U.S. Cl. ............................. 134/16; 134/1; 134/42; 134/123; 15/89; 15/94
(58) Field of Search ............................. 134/1, 42, 123; 15/89, 94; 244/134 R, 134 D

(56) References Cited

U.S. PATENT DOCUMENTS

| | | | | |
|---|---|---|---|---|
| 3,014,814 A | * | 12/1961 | McConica | 427/165 |
| 4,501,390 A | * | 2/1985 | Modzinski et al. | 237/12.3 C |
| 4,875,644 A | * | 10/1989 | Adams et al. | 244/134 R |
| 5,129,598 A | * | 7/1992 | Adams et al. | 244/134 D |
| 5,141,160 A | * | 8/1992 | Waters | 239/284.1 |
| 5,782,435 A | * | 7/1998 | Ingram et al. | 244/134 D |
| 5,987,216 A | * | 11/1999 | Krug | 392/379 |
| 6,237,861 B1 | * | 5/2001 | Northrop et al. | 239/284.1 |
| RE38,024 E | * | 3/2003 | Adams et al. | 244/134 D |
| 6,660,968 B1 | * | 12/2003 | Mottelet et al. | 219/203 |

* cited by examiner

Primary Examiner—Alexander Markoff
(74) Attorney, Agent, or Firm—Tarolli, Sundheim, Covell & Tummino L.L.P.

(57) ABSTRACT

Deicing of an external mirror (10) on a vehicle is effected by applying a sudden deformation force to the mirror. Sandwiched between the mirror (10) and a mounting surface (12) is a structure that includes a ribbon conductor (14), portions of which overlap each other in such a way that current through the conductor passes through these portions in opposite directions. A capacitor (32) is discharged through the conductor (14), generating a magnetic field that results in mutual repulsion between the overlapping portions. The mounting surface resists this repulsion force, which is instead transferred to the mirror (10), causing momentary distortion, and dislodgment of ice on the mirror surface. The same technique is also applicable to deicing of windows.

11 Claims, 1 Drawing Sheet

METHOD AND APPARATUS FOR DEICING MIRRORS OR WINDOWS

This invention was made with Government support under Contract No. DAAH01-99-C-0003 awarded by the United States Army.

BACKGROUND OF THE INVENTION

The present invention relates generally to techniques for deicing optical surfaces, such as mirrors, exposed to icy environments outside a vehicle, such as a truck or automobile. External rear-view mirrors are essential to the safety of road vehicles, especially larger vehicles that have no internal rear-view mirrors. In certain weather conditions, ice can form on the mirror surfaces and pose a serious safety hazard. Typically, a driver or passenger in the vehicle cannot conveniently and safely reach the mirror to attempt to scrape away the ice. The use of a resistive heating element behind each mirror provides one possible solution to this problem, but deicing mirrors or windows by this means has the significant drawback that it is slow acting.

Accordingly, it will be appreciated that there is need for an alternative approach to mirror and window deicing, preferably one that acts rapidly to clear an ice layer from a surface. The present invention meets this need.

BRIEF SUMMARY OF THE INVENTION

The present invention resides in a method and apparatus for deicing mirrors or windows of vehicles. In brief, ice is dislodged from an external mirror or window surface by momentarily deforming the surface. A mirror to be deiced is mounted on a relatively rigid support surface and an electrical conductor is installed between the mirror and the support surface. The conductor is configured to include portions that overlap and are wound back on each other. When an electrical current is passed through the conductor, a magnetic field between the overlapping portions causes a mechanical repulsion force that deforms the mirror. The apparatus of the invention includes a capacitor that is charged up during normal operation of the vehicle and is rapidly discharged through the conductor when deicing needed. The sudden current pulse caused by the discharge of the capacitor results in a shock deformation of the mirror, which is preferably made of a relatively elastic material, such as a plastic polymer or a metal.

Briefly, and in general terms, the method of the invention includes the steps of charging a capacitor during normal operation of the vehicle, sensing the existence of ice on the mirror or window surface, actuating a firing switch to discharge the capacitor through a conductor located between the mirror or window panel and its supporting surface, and thereby deforming the mirror or window panel, to dislodge ice therefrom.

Other aspects and advantages of the invention will become apparent from the following more detailed description, considered in view of the accompanying drawings, of which the following is a brief description.

DETAILED DESCRIPTION OF THE INVENTION

Figure 1:
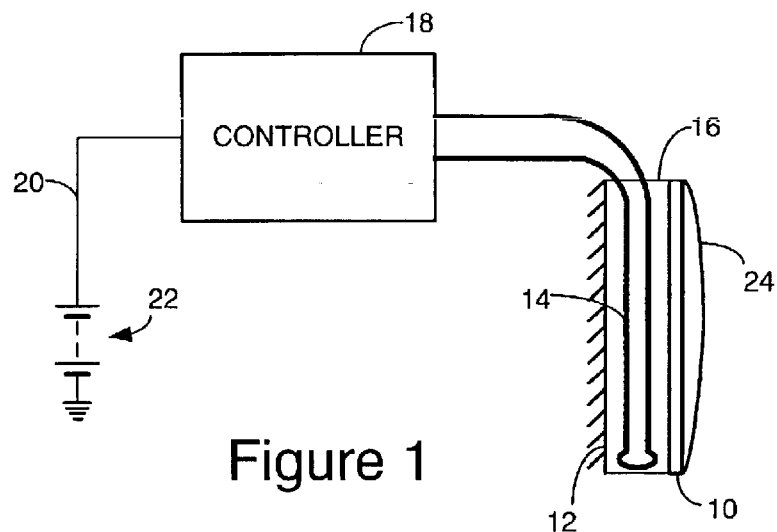
FIG. 1 is a diagrammatic view of the structure of the invention, shown coupled to a controller.

As shown in the drawings for purposes of illustration, the present invention pertains to apparatus and a related method for deicing mirrors and windows exposed to icing conditions. In accordance with the invention, ice is removed from a mirror by effecting a sudden mechanical deformation of the mirror surface. As shown in FIG. 1, for example, a planar mirror 10 is mounted on a structure that includes a relatively fixed surface 12. A ribbon conductor 14 is embedded in a suitable polymer material 16 between the mirror 10 and the fixed surface 12. The ribbon conductor 14 is configured to loop back over itself, at least in part, and may follow a serpentine path through the space between the mirror 10 and the fixed surface 12. The conductor 14 is coupled to a controller 18, which receives electrical power over line 20 from a vehicle battery 22.

When the conductor 14 receives a sudden burst of electrical current from the controller 18, a momentary but relatively strong magnetic field is generated around the conductor. Because portions of the conductor 14 are overlapping and carry current in opposite directions, the magnetic field will induce a mechanical force on these portions of the conductor, forcing them apart. The fixed surface 12 resists this force, but an opposite force is applied to the back of the mirror 10. If the mirror 10 is made from a suitable elastic material, such as a plastic or metal, the mirror will be momentarily deformed by the action of the current pulse in the conductor and the resulting mechanical force. The mirror 10 may include a lens 24, which should also be made from a suitable elastic material, such as a transparent plastic.

Figure 2:
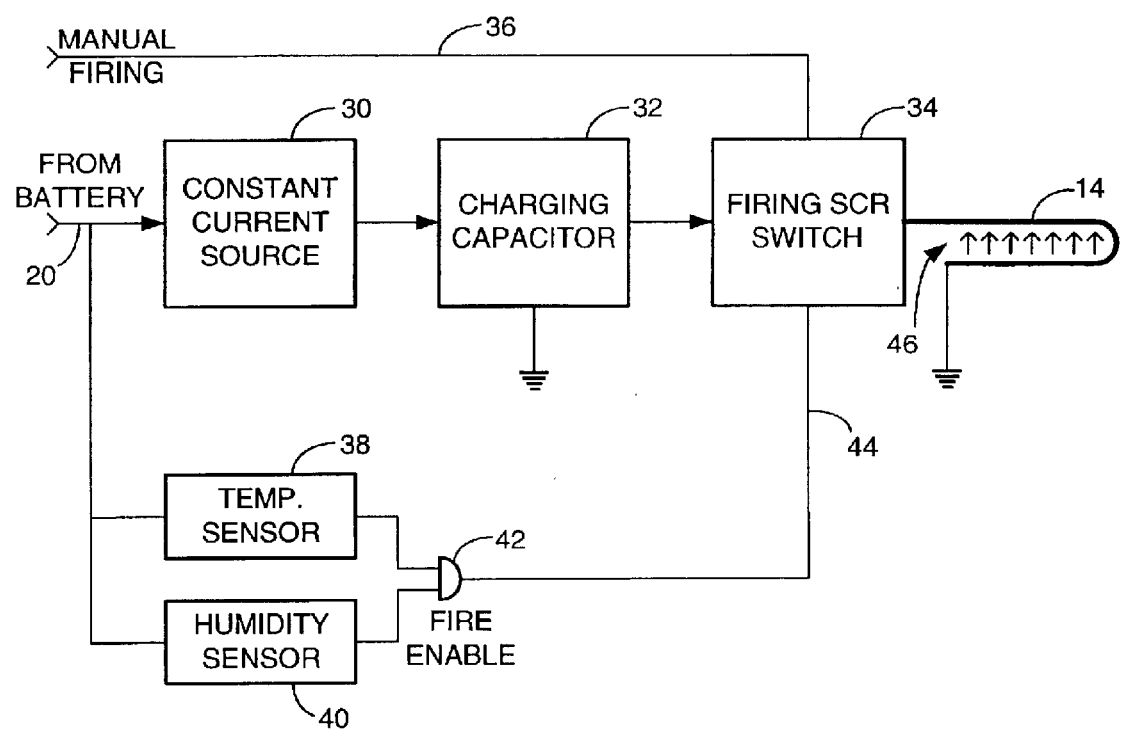
FIG. 2 is a block diagram of the controller of FIG. 1.

FIG. 2, shows the controller 18 in more detail. Power from the battery 22 is supplied to a constant current source 30 over line 20. The constant current source 30 supplies energy to a charging capacitor 32, which retains an electrical charge during normal operation of a vehicle in which this apparatus is installed. Coupled to the capacitor 32 is a firing switch 34 in the form a silicon controlled rectifier (SCR). An SCR is a very high speed transistor switch capable of switching relatively high currents. Operation of the firing switch 34 may be manually controlled, as indicated by a manual firing line 36, or its operation may be conditioned by shared levels of temperature and humidity, from a temperature sensor 38 and humidity sensor 40. These sensors are also powered with battery power supplied over line 20, and generate enabling output signals when the temperature and humidity reach preselected threshold levels. The output signals from the sensors 38 and 40 are logically ANDed together in an AND gate 42, and applied as an input over line 44 to the firing switch 34.

When the firing switch 34 is actuated, the fully charged capacitor 32 is discharged to ground through the conductor 14. As indicated by arrows 46, overlapping portions of the conductor 14 carrying current in opposite directions are mutually repelled. Since the conductor 14 is positioned between the fixed surface 12 and the mirror 10, this repulsion force on the conductor layers distorts the mirror 10 momentarily and causes ice to dislodge from the mirror surface. If the vehicle is moving, aerodynamic forces and vibration assist in dislodging the ice completely from the mirror surface.

The same technique may be used for vehicle windows that tend to ice over, particularly the rear windows. The fixed surface 12 in this instance must also be transparent, but must be less elastic than an outer layer that will be deformed by application of a current pulse to the conductor 14. In other words the conductor 14 as used to deice a window will be sandwiched between inner and outer transparent layers, in much the same way that resistance heaters are conventionally embedded in rear automobile windows. The inner transparent layer may, for example, be a conventional tempered glass panel, while the outer layer may be a plastic polymer that will deform upon application of the current pulse to the conductor 14.

It will be appreciated from the foregoing that the present invention represents a significant advance in the field of deicing techniques for vehicle mirrors and windows. In particular, the invention deices a desired surface by applying a sudden and relatively large current pulse to a conductor located behind the surface to be deiced. Because the conductor has portions of its length that are folded back on themselves, the current induces a magnetic field that mutually repels these portions and causes a shock deformation in the mirror or window surface. The deformation breaks adhesion of ice to the surface, and ice removal is further accelerated by wind and vibration effects. It will also be appreciated that, although a specific embodiment of the invention has been described for purposes of illustration, various modifications may be made without departing from the spirit and scope of the invention. Accordingly, the invention should not be limited except as by the amended claims.

What is claimed is:

1. Apparatus for deicing an external surface of a mirror or window panel, comprising:

an elastically deformable mirror or window panel;

a relatively rigid mounting structure for the mirror or window panel;

an electrical conductor embedded in a mass of elastic material between the mirror or window panel and the mounting structure, wherein the electrical conductor includes portions that are folded back one on another; and an electrical current pulse generator coupled to the electrical conductor to apply a sudden current pulse, wherein current flowing through the portions folded back one on another causes a mutual repulsion force between the portions, which force is transmitted to the mirror or window panel and causes momentary deformation and dislodgment of the ice.

2. Apparatus as defined in claim 1, wherein the electrical conductor is a ribbon conductor embedded in a mass of plastic polymer material.

3. Apparatus as defined in claim 2, wherein:

the surface to be deiced is on a mirror; and the mounting structure is a mirror mount attached to a vehicle.

4. Apparatus as defined in claim 3, and further comprising a lens attached to the mirror surface and also made of an elastically deformable material.

5. Apparatus as defined in claim 2, wherein:

the surface to be deiced is a window; and the mounting structure is transparent.

6. Apparatus as defined in claim 1, wherein the electrical current pulse generator includes:

a capacitor;

a current source connected to the capacitor to maintain the capacitor in a state of charge in normal operation;

a firing switch, connected between the capacitor and the electrical conductor; and means for actuating the firing switch, to discharge the capacitor through the electrical conductor.

7. Apparatus as defined in claim 6, wherein the means for actuating the firing switch includes a manual switch.

8. Apparatus as defined in claim 6, wherein the means for actuating the firing switch includes a temperature sensor and a humidity sensor, coupled to the firing switch to enable firing when selected temperature and humidity conditions are met.

9. A method for deicing a mirror or window panel, comprising the steps of:

mounting the mirror or window panel on a relatively rigid mounting surface, with a mass of elastic material between the mirror or window panel and the mounting surface and an electrical conductor embedded in the mass of elastic material, wherein the electrical conductor includes overlapping portions that have been positioned one over the other; and generating a current pulse and applying it to the electrical conductor, wherein the overlapping portions of the conductor are mutually repelled by an electromagnetically induced force and the mirror or window panel is momentarily deformed and ice is detached therefrom.

10. A method as defined in claim 9, wherein the step of generating and applying a current pulse includes:

charging a capacitor over a period of time; and closing a firing switch between the capacitor and the electrical conductor, to apply the pulse to the electrical conductor.

11. A method as defined in claim 10, wherein the step of closing the firing switch includes enabling closing the firing switch based on sensed temperature and humidity levels.

* * * * *